Feb. 23, 1971                H. NICKEL                3,565,762

ABSORBER ELEMENT FOR NUCLEAR REACTORS

Filed May 24, 1968

Hubertus Nickel
INVENTOR.

BY *Karl J. Koss*

ATTORNEY 3,565,762
ABSORBER ELEMENT FOR NUCLEAR REACTORS
Hubertus Nickel, Julich, Germany, assignor to Kernforschungsanlage Julich des Landes Nordrhein-Westfalen-e.V., Julich, Germany, a corporation of Germany
Continuation-in-part of application Ser. No. 617,280, Feb. 20, 1967. This application May 24, 1968, Ser. No. 731,791
Claims priority, application Germany, Feb. 26, 1966, K 58,574
Int. Cl. G21c 7/10
U.S. Cl. 176—86     4 Claims

ABSTRACT OF THE DISCLOSURE

An absorber element for the regulation and control of neutron flux in a nuclear reactor and especially "stacked-ball," "stacked-particle" or "ordered-bed" reactors wherein a body of graphite or zirconium alloy contains a mass of coated absorber particles having cores of high-melting-point borides, i.e. the diborides of zirconium, vanadium, hafnium or tantalum. The particles, having a particle size of the order of 100 to 500 microns (several hundreds of microns), are formed by coating these cores with pyrolytic carbon, and conventional coated-particle carbides or oxides.

---

This application is a continuation-in-part of application Ser. No. 617,280 filed Feb. 20, 1967 (now abandoned).

My present invention relates to absorber elements for nuclear reactors and, more particularly, to an absorber element for the control and regulation of the flux density and power density or efficiency of a nuclear reactor.

Nuclear reactors generally comprise a reactor core adapted to receive fuel elements of a fissionable material, either as rods or in some other form so as to produce a neutron flux which differs at various locations within the reactor core depending upon the geometrical arrangement of the fuel loci. In practice, the nuclear reactor is controlled and the activity or reactions "moderated" by the selective absorption of neutrons to control the flux density at the various locations and/or the overall flux thereby maintaining substantially constant any selective flux condition and eliminating periodic or aperiodic variations of the flux. Absorber materials are also used to decrease the flux density rapidly upon development of emergency conditions, to establish any predetermined flux conditions at any desired location within the reactor core and to eliminate the more or less spontaneous fluctuations in the flux of the reactor during the operatic period. In general, absorbers for neutrons in nuclear reactors of this character must have relatively high effective neutron cross-sections at the neutron energies or speeds prevalent in the reactor. It has long been recognized that boron has a relatively high neutron cross-section and it has already been proposed to incorporate boron in steels (boron-alloy steels) or to combine boron with other materials so as to form a control or absorber element for a nuclear reactor.

This arrangement has, however, the disadvantages that it is ineffective for nuclear reactors in which the fuel is present in the form of particles or relatively small bodies. In these systems, it has been proposed to incorporate boron-carbide ($B_4C$) particles in a hollow graphite body and to constitute the bodies of a size corresponding to that of the fuel element. However, such absorber elements are not fully effective in that boron carbide is not wholly stable and the boron has a tendency to diffuse through the graphite layer of any encasing body. The diffusion of boron is strongly dependent upon the temperature and is especially disadvantageous at the conditions prevalent in nuclear reactors operating with these particles. In fact, the boron diffusion in coated particles of the aforedescribed character increases to such an extent at temperatures of the order of 900° C., as may occur in such reactors, that the coating of pyrolytic carbon is ruptured or fractured.

While nuclear-fuel elements have already been proposed in which relatively large bodies of graphite or the like contain masses of particles with high neutron cross-section for ordered-bed and stacked-ball nuclear reactors, the absorber elements proposed in these systems have, in general, proved to be ineffective.

It is the principal object of the present invention to provide an improved absorber element and a method of making same for use in nuclear reactors and especially for use in the control and regulation of the neutron flux of high-temperature "stacked-ball," "ordered-particle" and like reactors.

Another important object of this invention is to provide an improved absorber element capable of being used as part of the absorber material in a system for the control and regulation of the flux of a nuclear reactor.

Yet a further object of the invention is to provide an improved method of controlling a nuclear reactor.

These results may be achieved, in accordance with my invention, through the provision of an absorber element in the form of spheroidal bodies of a diameter common in such reactors (1 cm. to 15 cm.) containing absorber particles wherein a high-melting-point boride is surrounded by carbon (e.g. pyrolytic graphite) and/or known carbides and oxides commonly used in coated-particle reactor technology (see, for example, R. W. Dayton, J. H. Oxley and C. W. Townley, Ceramic Coated Particle Nuclear Fuels, Journal of Nuclear Materials, volume II, pages 1–31, 1964, wherein beryllium oxide, magnesium oxide, aluminum oxide, zirconium oxide, silicon carbide, zirconium carbide and niobium carbide are listed as coating oxides and carbides); the core of the particles is composed of zirconium boride ($ZrB_2$), vanadium boride ($VB_2$), hafnium boride ($HfB_2$) and tantalum boride ($TaB_2$). This invention is based upon my discovery that particle cores of the aforementioned high-melting-point borides, when coated with pyrolytic graphite, coating oxides (beryllium oxide, magnesium oxide, aluminum oxide and zirconium oxide) or coating carbides (silicon carbide, zirconium carbide and niobium carbide), are highly stable under long-term thermal stress even in the presence of graphite. This is indeed surprising since it would normally be thought that the boride atoms, whether constituting a high-melting-point compound with the aforementioned metals or present in some other form, would diffuse through the graphite or other coating layer. As a practical matter, however, when zirconium boride, vanadium boride, hafnium boride and tantalum boride are used in the practical cores, individually or in mutual admixture, there is no noticeable diffusion of boron. In fact, the particles are especially advantageous because of another characteristic, namely their stability or inertness, when coated with pyrolytic carbon or the usual coating oxides or carbide to water vapor.

A further advantage of the present system resides in the use of hafnium boride and tantalum boride since, in the nuclear reaction within the core of the reactor, radioactive hafnium and tantalum nucleides are formed and serve to generate emissions which are radically distinguished from those of the similarly shaped fuel elements and enable separation of the fuel elements from the absorber elements during the recycling thereof.

According to a further feature of this invention, diffusion of reaction products (e.g. helium) and the like out of the particles and into the encasing body is prevented by the coating step; thus, when the diborides of zirconium, vanadium, hafnium and/or tantalum are coated and encased in claddings of steel or zirconium alloys commonly used in nuclear reactors or shells of graphite, the mechanical stresses due to internally developed gases (e.g. helium) are avoided.

The present invention finds its principal applicability in "stacked-ball" and "ordered-bed" nuclear reactors of the type illustrated and described, for example, in U.S. Pat. No. 3,142,625 ("stacked-ball" system), and U.S. Pat. Nos. 3,058,897 and 3,262,859 ("ordered-bed" reactors). More specifically, the balls of the present invention may be of the dimensions and configurations shown in the first-mentioned of these patents, with shells composed of corresponding materials. According to a more specific feature of this invention, however, the ball is composed of graphite or one of the aforementioned shell materials, and the mass particles, whose particle size is of the order of several hundreds of microns (i.e. from 100 to 500 microns) and is embedded in the encasing material or disposed within a hollow space left in the body of the absorber element. Furthermore, I have found that excellent results are obtained when, where the coated-boride particles are embedded in the mass of graphite, an outer zone of the encasing material is left free from these particles, the zone advantageously having a thickness of at least one-fifth the radius of the ball. Furthermore, the coated particles may have one or more coatings, as will be apparent hereinafter, of pyrolytic carbon or conventionally coated-particle carbides and oxides, these coatings having a collective thickness equal to or less than the radius of the boride core.

The above and other objects, features and advantages of the present invention will become more readily apparent from the following description, reference being made to the accompanying drawing in which.

Figure 1:
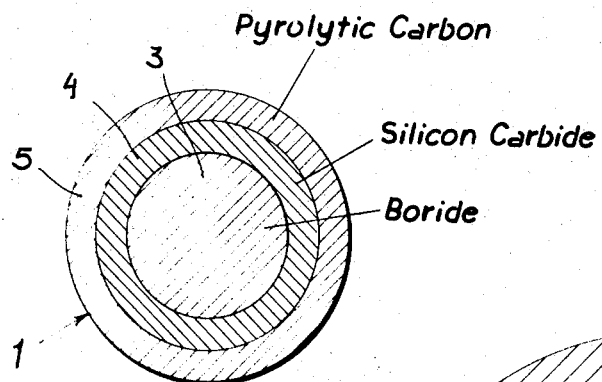
FIG. 1 is a cross-sectional view through a coated-boride particle of the present invention.
Figure 2:
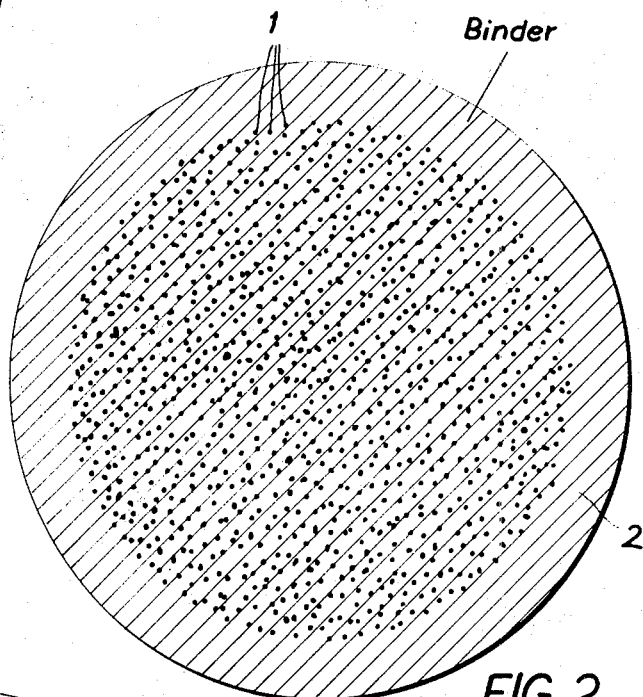
FIG. 2 is an enlarged cross-sectional view of an absorber element according to this invention.

In FIG. 1 of the drawing, I show an absorber particle whose boride core 3 is surrounded by an outer layer 4 of silicon carbide and a further pyrolytic-carbon layer 5. The particle 1 has, as its core 3, one or more high-melting-point borides and preferably a diboride of metals of the Groups IV to VI, Periods IV through VI of the periodic arrangement of the element, preferably a diboride of zirconium, vanadium, hafnium and tantalum. The particles 1 are embedded in a binder 2, preferably graphite, and formed into spheres, as illustrated in FIG. 2, for use as moderator elements in a stacked-ball reactor (see U.S. Pat. No. 3,142,625). Preferably, the particles 1 are disposed centrally in the mass 2 so as to leave a spheroidal shell or zone free of the particles, this shell acting as a barrier to diffusion and for the mechanical stability.

While the high-melting-point core 3 of the particles 1, which have diameters between 100 and several hundred microns, are surrounded by a silicon-carbide layer 4 and their pyrolytic carbon layer 5 in the particular structure illustrated in FIG. 1, it will be understood that a number of similar or different layers can be built upon by conventional particle-coating technique to form a multi-layer shell for the core. Thus, the layer 5 may be surrounded by a further carbide or oxide layer or a number of such layers, or both layers 4 and 5 can be replaced by a single pyrolytic-carbon layer.

Figure 3:
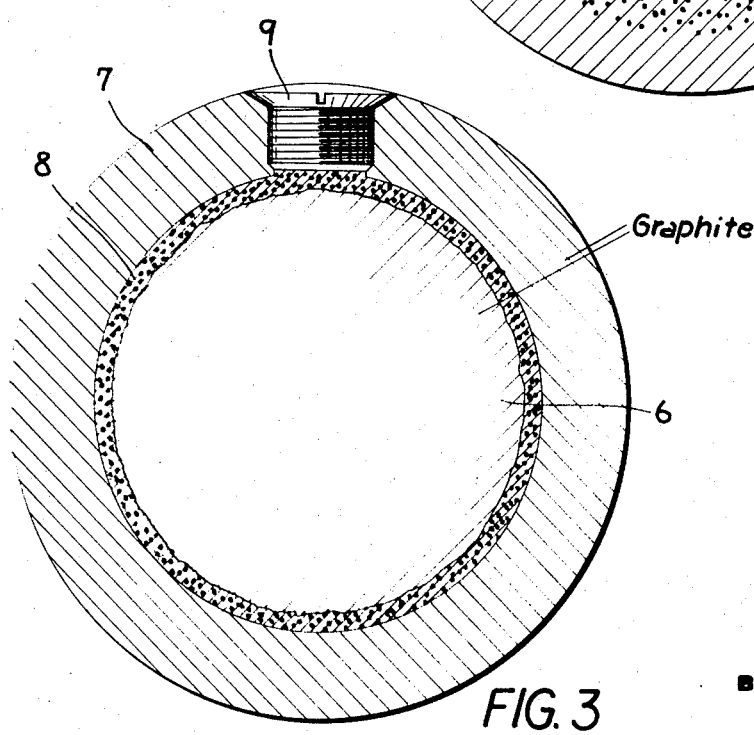
FIG. 3 is a view similar to FIG. 1 of another ball-shaped absorbed element.

In the embodiment of FIG. 3, I show a "hollow" absorber element of spheroidal configuration which comprises a ball-shaped graphite body 6 which is surrounded with substantially all-around clearance by a spheroidal outer shell 7, also of graphite. The spheroidal clearance is filled with coated boride particles 1, dispersed in a binder 2. A plug 9 is threaded into the outer shell 7 to close the access opening to the ball-shaped space upon introduction of the boride particles 1.

The absorber elements of FIGS. 2 and 3 are representative of the most effective configurations possible in accordance with this invention and these absorber bodies can be used directly in the circuit of U.S. Pat. No. 3,142,625 to control the nuclear reaction. It will be understood, however, that the hollow balls of that patent, of various configurations, may also be advantageously used as absorber elements when filled with coated boride particles in accordance with the present invention.

From FIG. 2 it will be seen that the outer zone of the graphite-encasing mass 2 is free of the particles 1 and has a zone thickness equal to a fraction of the radius of the ball. This thickness preferably ranges between one-fifth and one-half the ball radius. Similarly, the outer shell 7 of the ball of FIG. 3 may have a thickness bearing this relationship to the overall diameter of the ball. The balls themselves (FIGS. 2 and 3) can have diameters within the range common in the reactive system (U.S. Pat. No. 3,142,625) and preferably between 1 cm. and 15 cm.

I claim:

1. An absorber element for the regulation of the neutron flux of a nuclear reactor, comprising a mass of particles having a particle size of about 100 to 500 microns each having
    a core of a high-melting-point boride selected from the group which consists of the diborides of zirconium, vanadium, hafnium and tantalum,
    a shell of a material selected from the group which consists of magnesium oxide, beryllium oxide, aluminum oxide, zirconium oxide, silicon carbide, zirconium carbide and niobium carbide surrounding said core, and
    a coating of pyroltic carbon sheathing said shell; and
    a body of generally spheroidal configuration and composed at least in part of graphite receiving said mass in the interior thereof, said particles being distributed in said body, said body having an outer graphite shell free from said particles.

2. The absorber element defined in claim 1 wherein said core is surrounded by a silicon-carbide layer and said silicon-carbide layer is surrounded by pyrolytic carbon, said outer graphite shell having a thickness of at least one-fifth the radius of said body.

3. The absorber element defined in claim 2 wherein said particles are embedded in said body.

4. The absorber element defined in claim 2 wherein said body is hollow and said particles are disposed in the interior thereof.

References Cited

UNITED STATES PATENTS

| | | | |
|---|---|---|---|
| 3,129,188 | 4/1964 | Sowman et al. | 176—91 |
| 3,158,547 | 11/1964 | Smith | 176—91 |
| 3,179,723 | 4/1965 | Goeddel | 176—91 |
| 3,212,989 | 10/1965 | Fitzer et al. | 176—91 |
| 3,284,314 | 11/1966 | Rachor et al. | 176—90 |

(Other references on following page)

UNITED STATES PATENTS

| | | | |
|---|---|---|---|
| 3,298,921 | 1/1967 | Bokros et al. | 176—91 |
| 3,312,597 | 4/1967 | Glueckauf | 176—91 |
| 3,325,363 | 6/1967 | Goeddel et al. | 176—93 |
| 3,329,744 | 7/1967 | Kaufmann et al. | 176—93 |
| 3,356,618 | 12/1967 | Rich et al. | 176—93 |
| 3,372,213 | 3/1968 | Nishiyana et al. | 176—93 |

FOREIGN PATENTS

| | | | |
|---|---|---|---|
| 1,202,910 | 10/1965 | Germany | 176—90 |
| 933,500 | 8/1963 | Great Britain | 176—91 |

OTHER REFERENCES

Power Reactor Technology, vol. 4, No. 4, September 1961, pp. 39–46.

Journal of Nuclear Materials, vol. 11, 1964, pp. 1–14.

CARL D. QUARFORTH, Primary Examiner

H. E. BEHREND, Assistant Examiner

U.S. Cl. X.R.

176—91